United States Patent [19]
McKee et al.

[11] Patent Number: 5,373,924
[45] Date of Patent: Dec. 20, 1994

[54] SHIFT MECHANISM FOR AN OFF-HIGHWAY IMPLEMENT

[75] Inventors: Kenneth E. McKee, Chicago; Ralph D. Price, Plainfield; Francis A. Peterson, Joliet, all of Ill.

[73] Assignee: Case Corporation, Racine, Wis.

[21] Appl. No.: 131,702

[22] Filed: Oct. 5, 1993

[51] Int. Cl.$^5$ .................. B60K 41/22; F16H 61/22
[52] U.S. Cl. .................. 192/3.63; 74/477; 74/483 R
[58] Field of Search .............. 192/3.62, 3.63; 74/477, 74/483 R

[56] References Cited

U.S. PATENT DOCUMENTS

| | | | |
|---|---|---|---|
| 754,638 | 3/1904 | Brennan | 192/3.63 X |
| 804,971 | 11/1905 | Packward et al. | 192/3.63 X |
| 1,389,195 | 8/1921 | Horr | 192/3.62 X |
| 2,748,910 | 6/1956 | Klecker | 192/3.63 |
| 2,847,871 | 8/1958 | Schik | 192/3.62 X |
| 3,104,558 | 9/1963 | Herr, Jr. | 74/483 R X |
| 4,438,657 | 3/1984 | Nobis | 74/477 |

FOREIGN PATENT DOCUMENTS

4-103440  4/1992  Japan .................. 192/3.63
1214027  11/1970  United Kingdom .................. 74/477

*Primary Examiner*—Richard M. Lorence
*Attorney, Agent, or Firm*—Rudnick & Wolfe

[57] ABSTRACT

A shift mechanism for conditioning a transmission assembly of an off-highway implement. The transmission assembly includes a clutch assembly having a manually actuated clutch pedal for facilitating shifting of the transmission from a neutral condition to any of a plurality of drive conditions. The shift mechanism includes a shift lever mounted for movement toward and away from a neutral position corresponding to the neutral condition of the transmission assembly and a shifting assembly connected to the transmission assembly and mounted for movement along a predetermined path of travel. The shifting assembly is moved in response to shifting movements of the shift lever from for conditioning the transmission assembly into any of the plurality of drive conditions depending on the direction of movement of the shift lever. The shift mechanism further includes a neutral lock assembly for preventing movements of the shift mechanism from a neutral position until the clutch pedal is purposefully displaced from a preset position under the influence of the operator.

14 Claims, 6 Drawing Sheets

SHIFT MECHANISM FOR AN OFF-HIGHWAY IMPLEMENT

FIELD OF THE INVENTION

The present invention generally relates to off-highway implements such as a tractors and the like having a clutch operated transmission assembly and, more particularly, to a shift mechanism for conditioning the transmission assembly between a neutral condition and any of a plurality of drive conditions and which includes a neutral lock assembly for preventing the shift mechanism from moving from a neutral position until the clutch is purposefully operated to condition the driven transmission assembly in other than a neutral condition.

BACKGROUND OF THE INVENTION

Tractors and other forms of off-highway implements typically include a driven transmission assembly which is shiftable from a neutral condition to any of plurality of drive conditions to provide the operator with a broad range of operating conditions. In some offhighway implements, the transmission assembly includes a speed transmission and a range transmission arranged in combination with one another. The speed transmission typically includes a combination of gear meshes which define different power paths through the transmission. Synchronizers are commonly used between the different gear meshes to facilitate conditioning of the transmission during a shift from one power path to another power path. Similarly, the range transmission includes a combination of gear meshes which define different power paths through the range transmission. It is not unusual for the speed and range transmission combination to provide the operator with up to 16 different drive conditions in which the implement can be operated.

The speed transmission is typically connected to the engine of the implement as through a clutch assembly. A typical clutch assembly includes a manually actuated clutch pedal which is biased into a preset position. As is conventional, depression of the clutch pedal by a predetermined amount effectively disconnects the driven transmission assembly from the engine and allows either the speed transmission or range transmission to be shifted from either a neutral condition to any of several different other conditions in which the operator desires to operate the implement.

Each transmission of the driven transmission assembly includes a shift mechanism for conditioning the respective transmission. As is well known, an elongated shift lever is connected to and conditions each respective transmission as through a shifting assembly. The shift lever is movable from a neutral position which corresponds to the neutral condition of the tractor or implement into the desired drive condition. The shifting assembly is responsive to the movements of the shift lever and is connected to the respective transmission.

Upon leaving the cab region of the implement, an operator commonly places the shift mechanism in a neutral position. Because of the confined space restraints in the cab region of the tractor, however, it is not unusual for an operator to inadvertently move the shift lever from the neutral condition upon entering or leaving the cab region. The problems with having the shift mechanism mistakably condition the driven transmission assembly in other than a neutral condition are well known in the art.

Various devices have been proposed and used for preventing operation of the implement until the transmission assembly is in a neutral condition. One well known device for effecting these ends includes a series of electric ball switches which are mounted within each transmission. These heretofore known switch devices are conventionally used to detect the linear position of the transmission shift rail relative to a neutral condition.

These heretofore known electric switch devices are relatively sensitive and have been known to fail after very short use. Thus, considerable time and effort is spent repairing and/or replacing the switches in the transmissions. Replacement of the switches often requires access to the transmission interior to effect sensitive adjustments thereby allowing proper operation of the switch. As will be appreciated, repair, replacement, and adjustment of the electrical switches results in "down time" for the tractor. Thus, the benefits achievable through the use of such devices is often offset by the time spent on repairing and/or replacing such devices.

Thus, there is a need and a desire for a transmission assembly shifting mechanism which includes a neutral lock system that is reliable in preventing movement of the transmission shifting mechanism from a neutral condition until purposefully desired by the operator.

SUMMARY OF THE INVENTION

In view of the above, and in accordance with the present invention, there is provided a shift mechanism for conditioning a driven transmission assembly of an off-highway implement. The transmission assembly of the off-highway implement includes a clutch assembly having a manually actuated clutch pedal for effectively disconnecting the transmission assembly from receiving power so as to permit shifting of the transmission assembly from a neutral condition to any of a plurality of drive conditions. The shift mechanism includes a shift lever mounted for movement toward and away from a neutral position corresponding to the neutral condition of the driven assembly and a shifting assembly mounted for movement along a predetermined path of travel and which responds to shifting movements of the shift lever away from its neutral condition to condition the driven assembly into one of the drive conditions depending upon the direction of shift lever movement. A salient feature of the present invention concerns a neutral lock assembly for preventing movement of the shift mechanism from a neutral position until the clutch pedal is purposefully displaced from a preset position under the influence of the operator.

The inventive principals associated with the shifting mechanism of the present invention are applicable to driven transmission assemblies having range and speed transmissions arranged in combination relative to each other or where a single transmission is used to condition the implement for operation in any of a plurality of conditions including a neutral condition. In those embodiments of an off-highway implement wherein a speed transmission and range transmission are used in combination with each other, each transmission will be provided with a separate shift lever and shifting assembly combination for conditioning the particular transmission into an operable condition.

In one form of the invention, each shifting assembly includes a pair of shift arms which are mounted in sideby-side relation relative to each other. A free end of the shift lever is disposed between the shift arms and is selectively engagable with either shift arm. In response to shifting movements of the shift lever, each shift arm is movable along a predetermined path of travel between a neutral position corresponding to the neutral condition of the respective transmission and either of two drive positions arranged on opposite sides of the neutral position of each shift arm.

In a preferred form, a casing mounts and houses components of the shifting mechanism including the neutral lock assembly. The neutral lock assembly of the present invention normally extends into the path of movement of the shift arms of a respective shifting assembly and operates to releasably maintain the shifting assembly and the shift lever in a neutral position until the operator purposefully depresses the clutch pedal.

The neutral lock assembly of the present invention preferably includes a lock mechanism arranged in combination with the shift mechanism of each transmission in the driven transmission assembly. Each lock mechanism is responsive to purposeful displacement of the clutch pedal from its preset operative position. That is, in response to displacement of the clutch pedal, each lock mechanism of the neutral lock assembly is removed from the predetermined path of travel of the shift arms of the respective shifting assembly thereby allowing movement of the shift arms and, thus, movement of the shift lever from a neutral position.

In a preferred form of the invention, each lock mechanism of the neutral lock assembly is preferably designed as a modular assembly that includes a mounting bracket which is connected to the casing and which serves to mount the locking mechanism in working relation to a respective shifting assembly, Each lock mechanism further includes first and second locking members which engage the shift arms as long as the clutch assembly is conditioned to transfer power to the driven transmission assembly, Each locking member is preferably configured as a cantilevered arm which is pivotally connected to the bracket for vertical pivotal movement relative to the first and second shift arms, In a most preferred form of the invention, each locking member is configured with guides for facilitating reciprocatory guided movement of the locking members relative to the mounting bracket.

In the preferred embodiment of the invention, the neutral lock assembly is mechanically interconnected to the clutch assembly through a force transfer mechanism which transmits the movements of the clutch pedal to each lock mechanism of the neutral lock assembly. The force transfer mechanism is connected to each lock mechanism such that upon purposeful displacement of the clutch pedal, each lock mechanism arranged in combination with the shift mechanism is released from engagement with the respective shifting assembly. In those transmission assemblies which include a speed transmission and a range transmission arranged in combination, a common force transfer mechanism is used to displace the lock mechanism associated with the shift mechanism of each transmission thereby allowing shifting movements of either the speed transmission or the range transmission upon depression of the clutch pedal.

The neutral lock assembly of the present invention involves a mechanical interlock system which responds to purposeful engagement by the operator. The neutral lock assembly of the present invention is economical to manufacture, efficient in operation, and positively locks the shift mechanism to prevent movements of the shift lever from a neutral position until the operator purposefully acts to condition the transmission assembly from a neutral condition.

These and other objects, aims and advantages of the present invention will become readily apparent from the following detailed description, appended claims, in the following drawings.

BRIEF DESCRIPTION OF THE DRAWINGS

FIG. 1 is a fragmentary top plan view, with parts broken away, of a cab region of a tractor or the like;

DETAILED DESCRIPTION OF THE PRESENT INVENTION

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Figure 1:
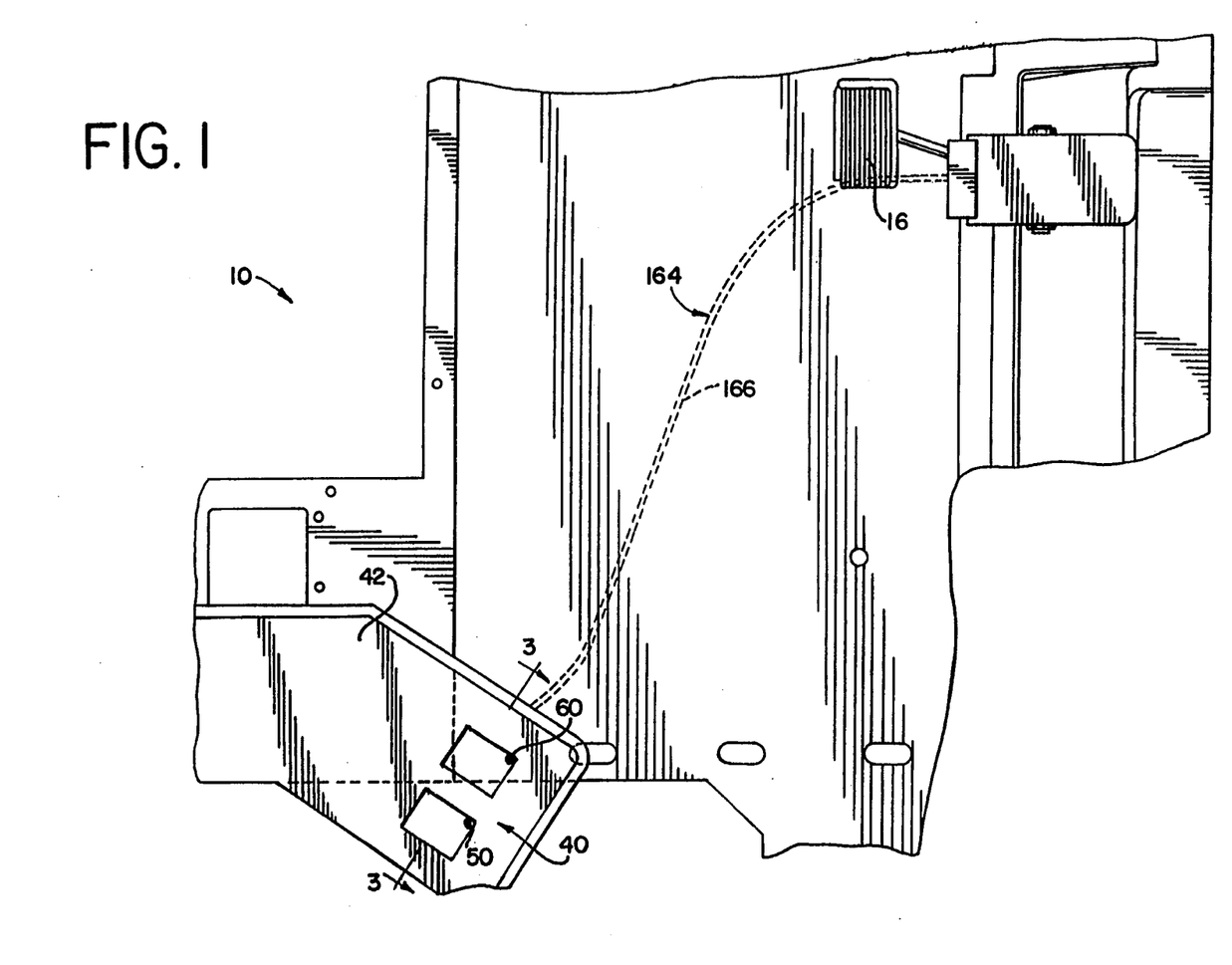
Figure 2:
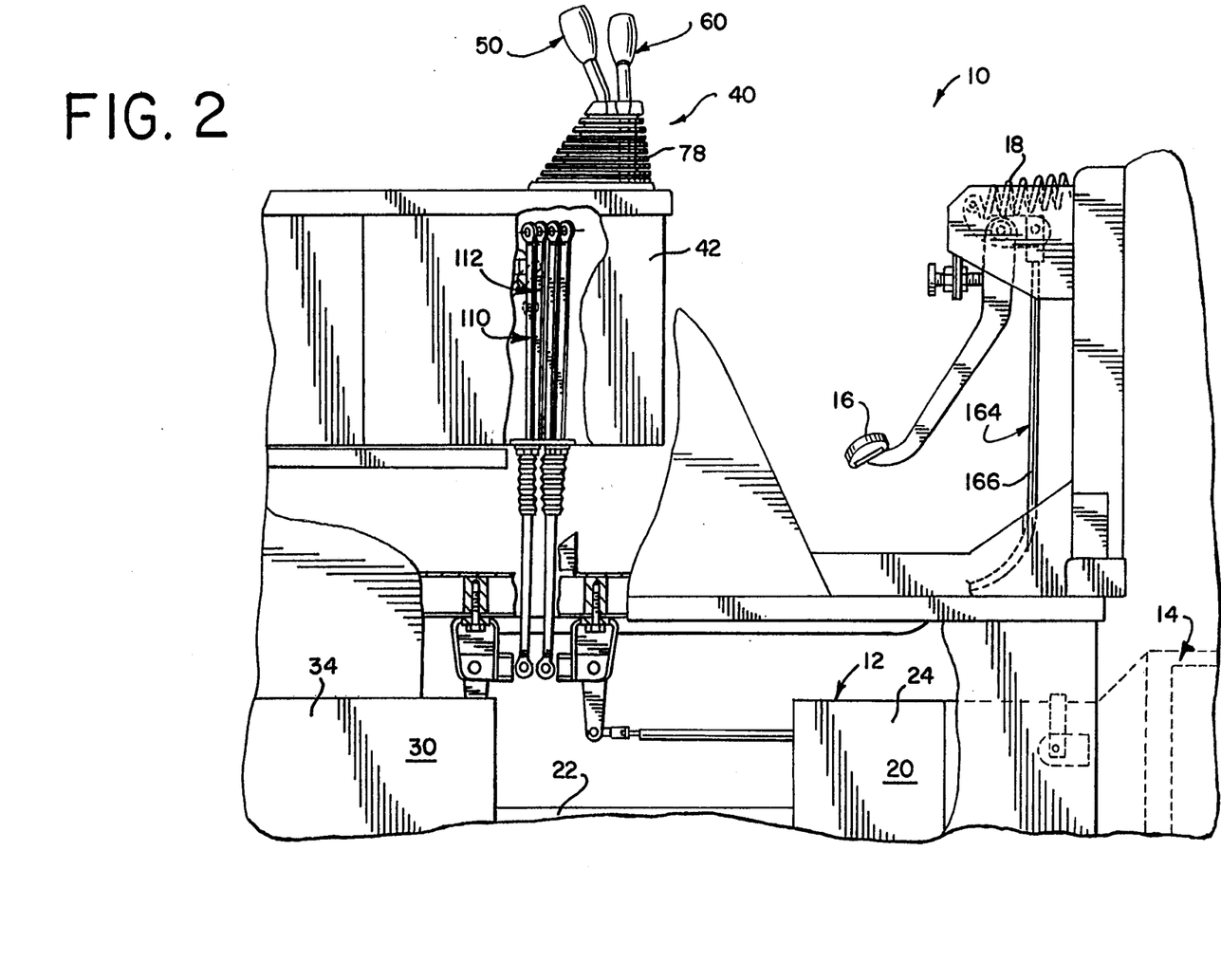
FIG. 2 is a side elevational view, with parts broken away, of the cab region illustrated in FIG. 1.

Referring now to the drawings, wherein like reference numerals indicate like parts throughout the several views, there is schematically represented in FIGS. 1 and 2 a cab region of an off-highway implement 10. The off-highway implement 10 is driven for movement across a field or the like as by a conventional self-propelled engine (not shown). As shown in FIG. 2, a shiftable driven transmission assembly 12 is mounted on a frame 13 of the tractor 10 and is selectively connected to the engine as through a conventional clutch assembly 14. The clutch assembly 14 includes a manually actuated clutch pedal 16 arranged in the cab region of the tractor for selectively controlling transference of power to the driven assembly 12. As shown, the clutch pedal 16 is normally biased under the influence of a spring 18 into a preset position whereat the clutch assembly 14 is operable to transfer power and torque to the driven assembly 12. In a manner well known in the art, it is possible to interrupt or disconnect the transfer of power and torque to the transmission assembly 12 as through purposefull displacement of the clutch pedal 16 from its preset position under the influence of the operator.

In the illustrated embodiment, the driven assembly 12 includes a speed transmission 20 and a range transmission 30 which are drivingly interconnected to each other. In the illustrated embodiment, the speed transmission 20 receives power from the engine through the clutch assembly 14. A suitable drive shaft 22 acts as an output for the speed transmission 20 and as an input for the range transmission 30. In the illustrated embodiment, the output of the range transmission 30 serves to drive the off-highway implement.

The speed transmission 20 includes a housing 24 mounted to the implement frame 13 and has a conventional gearing arrangement including a plurality of synchronized gear meshes arranged within the housing 24. In the illustrated embodiment, the speed transmission 20 includes four different gear meshes or gear combinations such that the speed transmission 20 is capable of developing at least four different gear ratios between input and output ends thereof.

The range transmission 30 includes a housing 34 mounted to the implement frame 13 and likewise has a conventional gearing arrangement including a plurality of gear meshes arranged within housing 34. In the illustrated embodiment, the range transmission 34 includes four different gear meshes or combinations such that the range transmission 30 is capable of developing four different speed ranges between input and output ends thereof. Since the speed transmission 20 and range transmission 30 are arranged in combination relative to each other, the off-highway implement is capable of developing up to sixteen different drive conditions of operation.

A shift mechanism 40 is provided in the cab region for conditioning the transmission assembly 12 of the implement between a neutral condition and any one of a plurality of drive conditions. As shown, a casing 42 is provided to mount and house the shift mechanism of the present invention.

The shift mechanism 40 of the present invention will be described as a mechanism capable of conditioning a transmission assembly having both a speed transmission and a range transmission. It should be appreciated, however, that in those configurations where only a single transmission is used to control the implement, the shift mechanism of the present invention will likewise be modified with a reduced number of parts.

Figure 3:
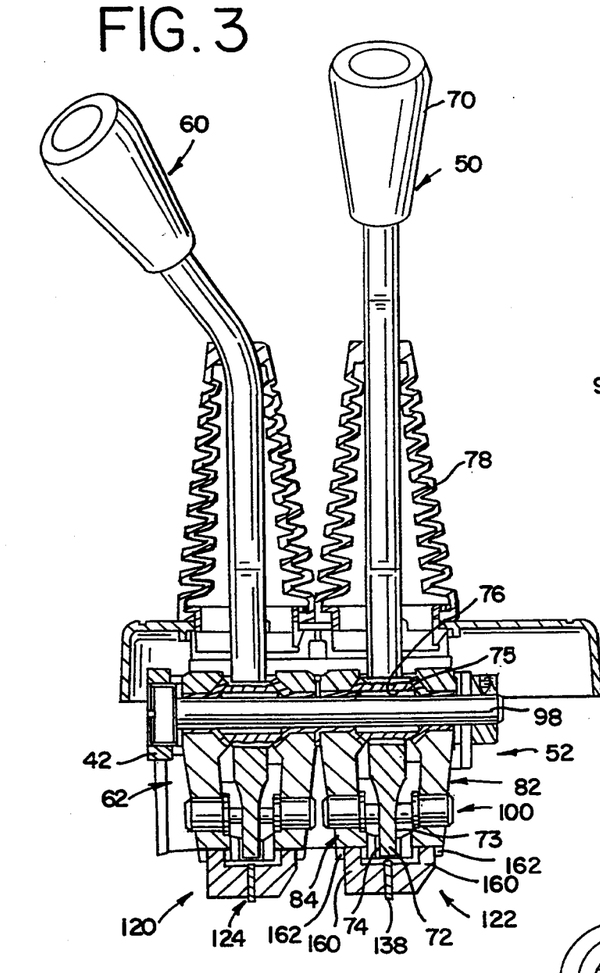
FIG. 3 is a sectional view taken along line 3—3 of FIG. 1 and illustrating one form of shift mechanism according to the present invention.

Turning now to FIG. 3, the shift mechanism 40 of the present invention is provided with a speed transmission shift lever 50 and a speed transmission shifting assembly 52. In the illustrated embodiment, the shift mechanism 40 further includes a range transmission shift lever 60 and a range transmission shifting assembly 62. As shown in FIG. 3, the shift levers 50 and 60 each extend beyond the casing 42.

In the illustrated embodiment, the shift levers 50, 60 and shifting assemblies 52, 62 for conditioning the speed and range transmissions 20, 30, respectively, are substantially similar. Accordingly, only a description of the shift lever 50 and shifting assembly 52 for the speed transmission 20 will be discussed in detail with the understanding that the shift lever 60 and shifting assembly 62 for the range transmission 30 are, in the illustrated embodiment, substantially similar in construction.

As shown in FIG. 3, each shift lever has an elongated configuration with a free upper end 70 and a free lower end 72. Notably, the lower end 72 of each shift lever is provided with generally flattened side surfaces 73 and 74 which extend for a relatively short distance upwardly from the distal end of the shift lever. Intermediate its ends, each shift lever has a generally spherical mounting portion 75 which defines a bore 76 extending transversely therethrough. A dust cover 78 may be secured to the casing 42 and extend upwardly along the length of each shift lever for inhibiting contaminants from interfering with proper operation of each shifting assembly.

Figure 4:
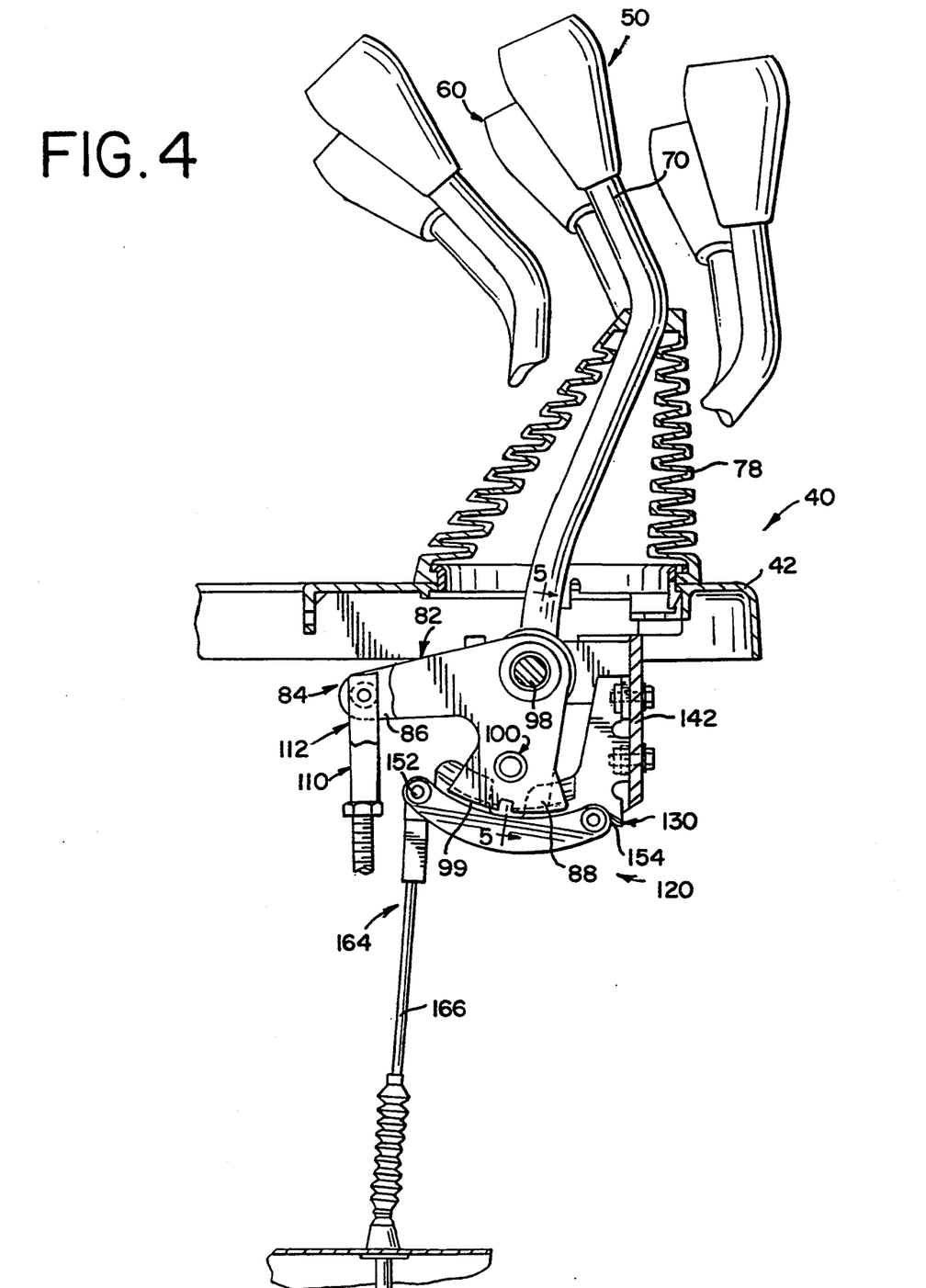
FIG. 4 is a side elevational view of the shift mechanism with shift levers of the shift mechanism being shown in various positions.

As shown, each shifting assembly includes first and second shift arms 82 and 84, respectively, arranged on opposite sides of the lower end 72 of a respective shift lever. The shift arms 82 and 84 are the mirror image of each other. Each shift arm 82, 84 preferably has a generally L-shaped configuration, including interconnected first and second leg portions 86 and 88 which extend in an angularly offset relation from one another as shown in FIG. 4.

Figure 5:
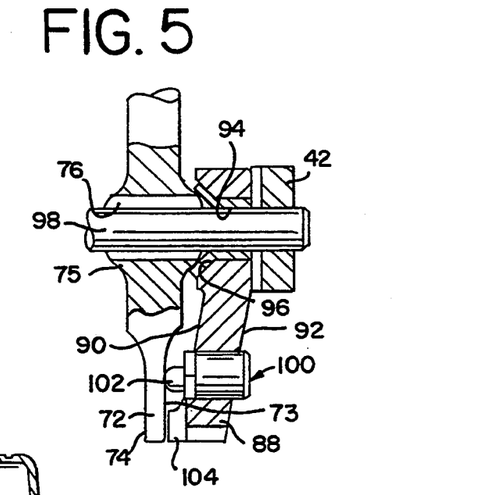
FIG. 5 is a sectional view taken along line 5—5 of FIG. 4.

As shown in FIG. 5, each shift arm includes inner and outer surfaces 90 and 92, respectively. The inner surfaces of the arms 82, 84 of a shifting assembly are arranged in confronting relation relative to each other. Each arm 82, 84 further includes a bore 94 extending transversely therethrough. An enlarged concave recess 96 is provided on the inner surface 90 of each shift arm in axial alignment with the bore 94. When the shifting assembly is assembled, the concave recesses 96 provided on inner surfaces of the shift arms, is 82, 84 define a socket for rotatably accommodating the spherical mounting portion 74 of the respective shift lever. A pin 98 transversely extends through the bore 94 in each shift arm 82, 84 and through the bore 76 in the shift lever and is secured to the casing 42. Thus, in the illustrated embodiment, both shift arms 82, 84 move along a predetermined path of travel. In the preferred embodiment, the predetermined path of travel of the shift arms 82, 84 defines an arc that is centered about pin 98. Moreover, the lowermost edge of each shift arm 82, 84 has an edge 99 having an arcuate configuration which is centered about the axis of pin 98.

By this construction, the shift lever of each shift mechanism is permitted to universally move in both fore-and-aft as well as in side-to-side directions in response to operator manipulation. In the illustrated embodiment, and as shown in FIG. 3, the pin 98 likewise serves to mount to the casing 42 the shift arms 82, 84 of the shifting assembly 62 for conditioning the range transmission 30.

In the illustrated embodiment, the leg portion 88 of each shift arm 82, 84 is provided with a shift lever centering mechanism 100. Each centering mechanism 100 includes a spring biased pin 102 which engages the respective side surface and sideways urges the lower end 72 of the shift lever toward a neutral position. Thus, after a shift lever of a shift mechanism has been returned in a fore-and-aft direction to a neutral position, the centering mechanism 100 associated with each arm 82, 84 automatically removes the shift lever from engagement with either shift arm 82, 84 of the respective shifting assembly.

Figure 6:
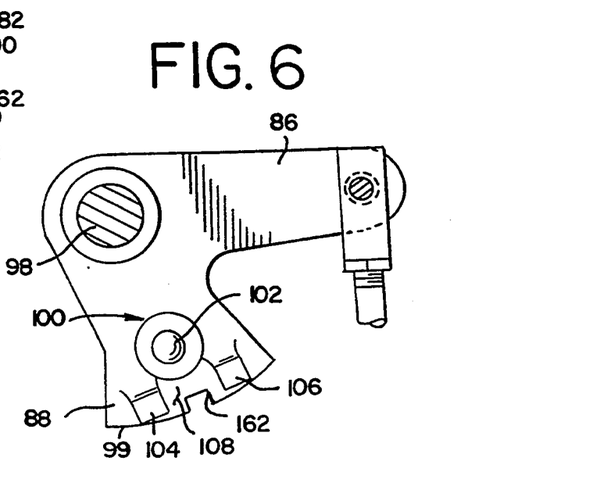
FIG. 6 is an enlarged fragmentary side view taken along line 6—6 of FIG. 3.

As shown in FIG. 6, the lower end of each leg portion 88 of each shift arm 82, 84 is furthermore provided with fore-and-aft spaced ears 104 and 106 which project away from the inner surface 90 of each shift arm 82, 84 and toward the lower end of the respective shift lever. The spacing between the ears 104 and 106 on each shift arm 82, 84 defines an opening 108 which releasably accommodates the lower end 72 of a sideways shifted shift lever. As will be appreciated, fore-and-aft movements of a sideways shifted shift lever will result in engagement of the lower end of the shift lever with either of the projecting ears thus causing the shift arm engaged thereby to move along a predetermined path of travel.

Returning to FIG. 4, a linkage mechanism 110 is connected to the distal end of the leg portion 86 of each shift arm 82. The purpose of the linkage mechanism 110 is to transmit movements of the shift arm 82 as it moves along its predetermined path of travel whereby conditioning the transmission connected thereto into either of its two drive conditions depending on the direction of shift lever movement. Another linkage mechanism 112 is connected to the distal end of the leg portion 86 of each shift arm 84. The purpose of the linkage mechanism 112 is to transfer movements of the shift arm 84 as it moves along its predetermined path of travel whereby conditioning the transmission connected thereto into either of another two drive conditions.

When the shift lever is in a generally centered or neutral position, as shown in complete solid lines in FIG. 4, the shift arms 82 and 84 of the respective shifting assembly are likewise positioned in a neutral position which corresponds to the neutral condition of the transmission connected thereto. As is conventional, to condition either transmission into a condition other than neutral requires purposeful displacement of the clutch pedal 16 from its preset position so as to effectively disconnect the transfer of power and torque to the transmission thereby permitting manipulation of the shift lever. As will be understood, sideways and forward movement of the shift lever of a shifting mechanism will result in movement of the respective shifting assembly. More specifically, and as shown in FIG. 3, leftward movement of a shift lever will cause the lower end of the shift lever 72 to be positioned for engagement with shift arm 82. Subsequent forward movement of the shift lever will result in displacement of the shift arm 82 along its predetermined path of travel which, in the illustrated embodiment is about an arc of a circle whose radius is defined by the pivot pin 98.

Forward movement of the shift arm 82 along its predetermined path of travel and away from its neutral position is transferred through the linkage mechanism 110 to the respective transmission thus conditioning the transmission into a drive condition. As will be appreciated, movement of the shift lever in a rearward direction will return the shift arm 82 of the respective shifting assembly to a neutral position and thereby returning the respective transmission to a neutral condition. Continued rearward movement of the shift lever through the neutral position will cause displacement of the shift arm 82 along its predetermined path of travel which is transmitted through the linkage mechanism 110 and, thus, resulting in conditioning of the respective transmission into another drive condition. Of course, other conditions for the respective transmission are effected by rightwardly moving the shift lever followed by similar fore-and-aft movements of the shift lever to properly actuate the shift arm 84. As will be understood, movements of the shift arm 84 are transmitted to the respective transmission through the linkage mechanism 112 thereby conditioning the transmission for operation in other drive conditions.

The cab region of the tractor has relatively tight space constraints because of various control mechanisms, i.e., the steering wheel and etc., that are compactly arranged in the area. That portion of each transmission shift lever 50 and 60 extending upwardly frown the casing 42 is, therefore, susceptible to being snagged or otherwise engaged by the operator moving about the cab region of the tractor. As discussed, movement of the shift levers 50, 60 readily results in a change in the condition of the transmission from a neutral condition to any of a plurality of drive conditions. In view of the above, the shift mechanism of the present invention is provided with a neutral lock assembly 120 for preventing movement of a shift lever from a neutral position until the operator purposefully desires to change the condition of the transmission assembly.

In the illustrated embodiment, and as shown in FIG. 3, the neutral lock assembly 120 involves a system which mechanically locks the shift mechanism in a neutral position and prevents movement of a shift lever until the operator purposefully acts to condition the transmission assembly in other than a neutral condition.

In an implement wherein both a speed transmission shift mechanism and a range transmission shift mechanism are employed, the neutral lock assembly 120 includes a speed transmission neutral lock mechanism 122 and a range transmission neutral lock mechanism 124. Of course, on those tractors or other off-highway implements wherein only one transmission is utilized, only one neutral lock mechanism will be provided in combination with the shifting mechanism for that transmission.

The speed transmission neutral lock mechanism 122 is substantially similar to the range transmission neutral lock mechanism 124. Accordingly, only a description of the speed transmission neutral lock mechanism 122 will be provided in detail with the understanding that the range transmission neutral lock mechanism 124 is substantially similar in construction and operation.

Figure 7:
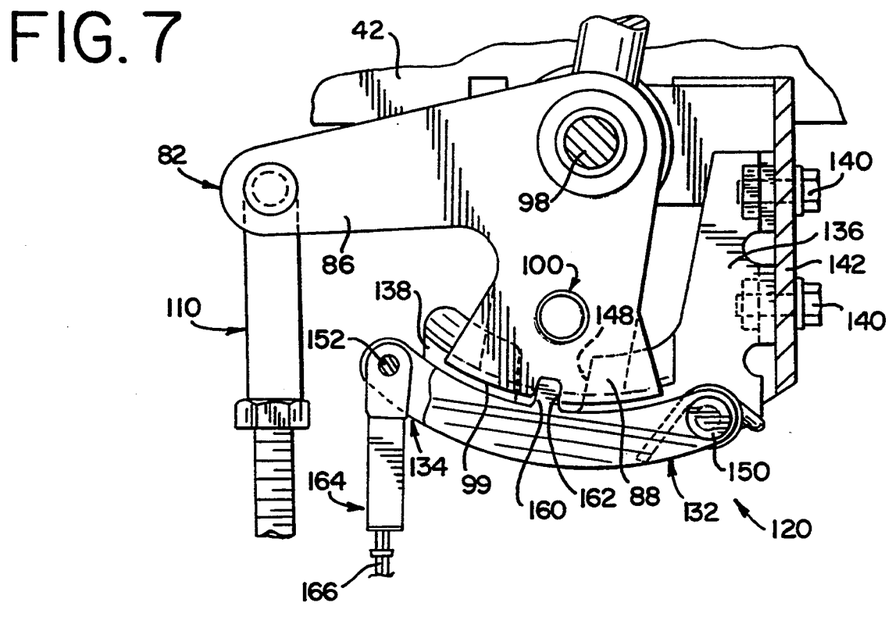
FIG. 7 is an enlarged side elevational view of a neutral lock assembly arranged in operative relation with a shifting assembly of the shift mechanism.
Figure 8:
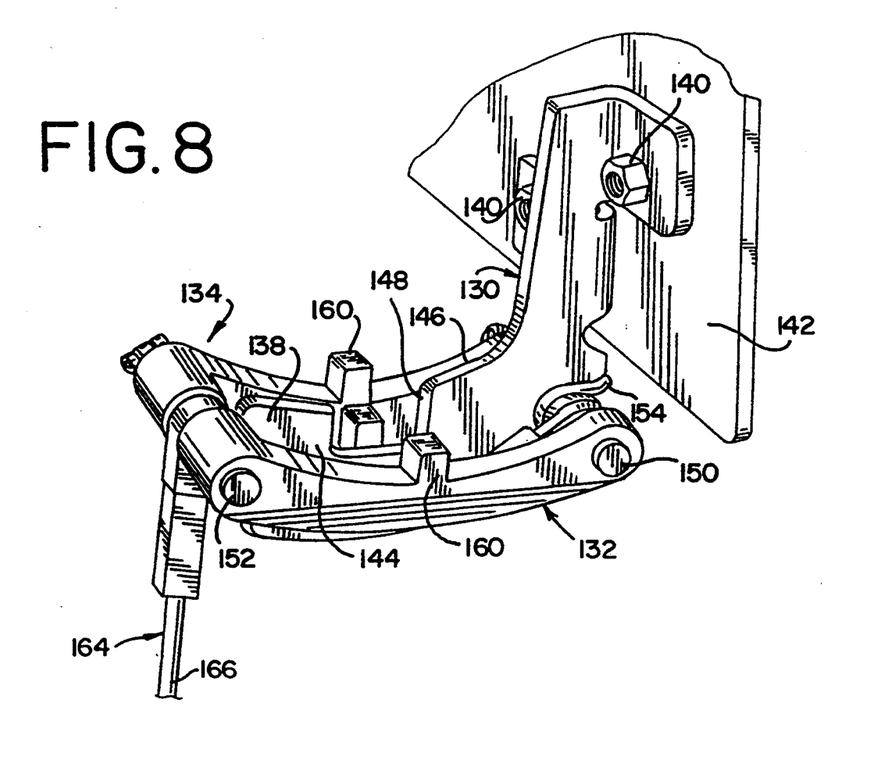
FIG. 8 is a perspective view of the neutral lock assembly of the present invention.
Figure 9:
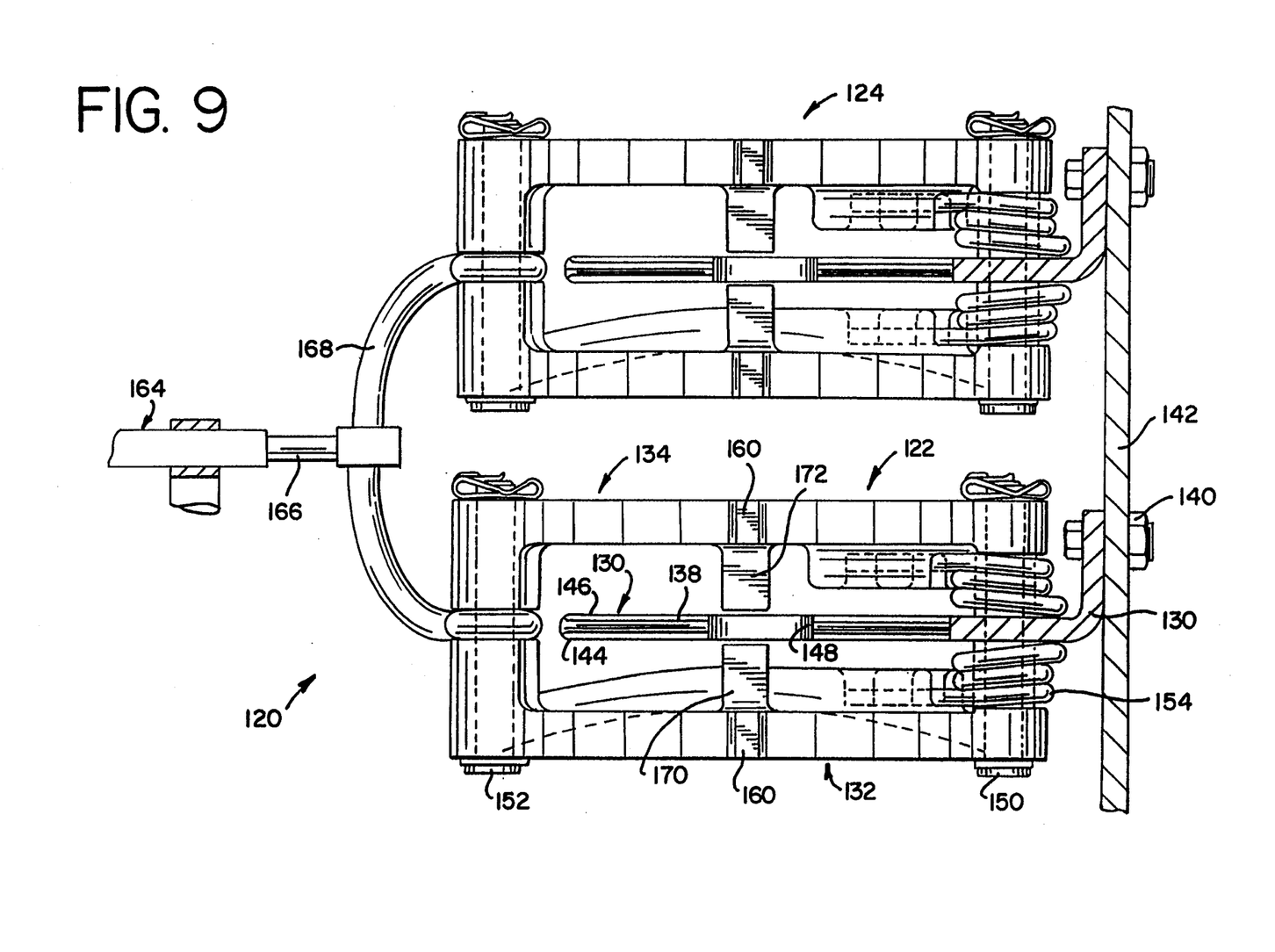
FIG. 9 is a top plan view of a pair locking mechanisms comprising a preferred form of a neutral lock assembly according to the present inventions.

As shown in FIGS. 7, 8 and 9, each neutral lock mechanism is designed as a modular unit that includes a generally L-shaped mounting bracket 130 with first and second locking members 132 and 134, respectively, arranged on opposites thereof. As shown, the mounting bracket includes a generally vertical first leg portion 136 and a generally horizontal second leg portion 138. The first leg portion 136 of bracket 130 is secured as by threaded fasteners 140 to a depending arm 142 provided as part of and within casing 42. In the illustrated embodiment, the second leg portion 138 of bracket 130 has generally vertical side surfaces 144 and 146 extending along the length thereof and which have a downwardly chamfered configuration toward an upper edge thereof. Notably, the second leg portion 138 of bracket 130 is further configured with a channel or slot 148 which is sized to permit side-to-side movement of the lower end 72 of a shift lever to effect engagement of the appropriate shift arm 82, 84 of the respective shifting assembly.

The locking members 132 and 134 are carried by the bracket 130 for movement, preferably, about a common axis. The locking members 132, 134 are mounted on bracket 130 to releasably and positively engage the shift arms 82 and 84 of a respective shift assembly thereby preventing movements of the shift arms 82, 84 and the respective shift lever from a neutral position until the neutral locking assembly is purposefully released by the operator to effect a change in the transmission condition.

In the illustrated embodiment, one end of each member 132, 134 is pivotally connected as with a pin 150 to the mounting bracket 130 to allow for generally vertical movement of the members 132, 134. Each member 132, 134 extends in a cantilevered fashion away from the pin 150 and are interconnected to each other at an opposite end by another pin 152. Notably, the length of the members 132, 134 is greater than the horizontal length of the leg portion 138 of the mounting bracket 130.

Intermediate their opposite ends, each locking member 132, 134 preferably has a curved configuration which is generally concentric to the arcuate path of travel of the shift arms 82, 84 and generally parallel to the lowermost edge 99 on the shift arms 82, 84. Moreover, the locking members 132, 134 are resiliently biased into a positive locking engagement with the shift arms 82, 84 respectively. As shown, the bight portion of a coil spring 154 engages the mounting bracket 130 while opposite free ends of the spring 154 engage and resiliently urge the locking members 132, 134 toward the generally curved surface 99 of each shift arm 82, 84 of a respective shifting assembly.

As shown in FIGS. 8 and 9, each locking member 132, 134 preferably includes an upward projection 160. When the shifting mechanism 40 is in a neutral position, the projection 160 on each locking member 132, 134 extends into the path of travel of the shift arms 82, 84 (FIG. 3) thereby preventing displacement of the shift arms 82, 84 and the respective shift lever from a neutral position. As shown in FIGS. 3 and 7, an opening or slot 162 is provided in each shift arm 82, 84 for releasably accommodating the projection 160 on each locking member 132, 134 and thereby establishing a positive locking relationship between the shifting assembly and a respective neutral lock mechanism so as to prevent displacement of the shift mechanism from a neutral position.

Each neutral lock mechanism is releasable from its positive locking engagement with a respective shifting assembly in response to a purposeful change in the transmission condition from a neutral condition. One method for detecting a purposeful change in the transmission condition is by monitoring the preset position of the clutch pedal 16. That is, when a change or shift in the transmission is desired, the clutch pedal 16 is depressed to operate the clutch assembly in a manner effectively disconnecting the transfer of power to the driven transmission assembly 12.

The neutral lock assembly 120 of the present invention is responsive to a purposeful change in the transmission condition. As shown in FIGS. 4 and 7, a force transfer mechanism 164 is used to release the neutral lock assembly in response to purposeful movement of the clutch pedal 16. In the most preferred form of the invention, the force transfer mechanism 164 includes a coaxial cable 166 having one end connected to the clutch pedal 16 (FIG. 2) and the opposite end connected to the pin 152 which joins the free ends of the locking members 132 and 134 of each neutral lock mechanism. Upon depression of the pedal 16, the cable 164 serves to positively remove the locking members 132, 134 of each locking mechanism from the path of travel of the shift arms 82, 84 of a respective shifting assembly thereby permitting the shift arms 82, 84 and respective shift lever to move from one position to another to appropriately condition the transmission.

As shown in FIG. 9, in those embodiments wherein, dual neutral lock mechanisms 122, 124 are provided in combination with a dual transmission arrangement, that end of the cable proximate to the neutral lock assemblies is conjointly connected as by a suitable connection 168 to both neutral lock mechanisms. Upon depression of the clutch pedal 16, both neutral lock mechanisms 122, 124 are released from positive engagement with their respective shift mechanisms thereby permitting shifting movements of either transmission.

The spring 154 associated with each neutral lock assembly is rated such that the locking members 132, 134 are biased against the shift arms 82, 84 of a respective shift mechanism with a force sufficient to readily seat the projection 160 within each grove or slot 162 in the shift arms 82, 84 to effect positive engagement therebetween. Thus, when the shift mechanism 40 is returned to a neutral position, the locking members 132, 134 automatically and positively engage the shift arms 82, 84.

The cantilevered design for the locking members 132, 134 of each neutral lock assembly tends to allow the members 132, 134 to twist when the force transfer mechanism 164 acts against the action of the spring 54 so as to remove the arms 132, 134 from positive engagement with the shifting mechanism. Therefore, and as shown in FIG. 9, each neutral lock mechanism includes a pair of guides 170 and 172 carried by the locking members 132, and 134, respectively. Each guide 170, 172 extends from its respective locking member 132, 134 and toward the leg portion 138 of the mounting bracket 130. As the locking members 132, 134 reciprocally move relative to the bracket 130, the guides 170, 172 tend to coact with the vertical surfaces 144, 146, respectively, on the leg portion 138 of the bracket 130 thereby preventing twisting movements of the locking assembly as it moves to release the shift mechanism and against the action of the spring 154. As will be appreciated, the chamfered upper surface on the leg portion 138 facilitates proper positioning of the locking members 132, 134 relative to opposite sides of the leg portion 138 during reciprocation of the neutral lock assembly.

During operation, the transmission shift mechanism 40 will normally be returned to a neutral position corresponding to a neutral condition for the driven transmission assembly 12 when the operator leaves the cab region of the off-highway implement. When the shifting mechanism 40 is positioned in a neutral position, the neutral lock assembly 120 prevents further displacement of the shift mechanism until the operator purposefully displaces the clutch pedal from its preset position.

In the illustrated embodiment, the locking members 132, 134 of each neutral lock mechanism extend into the path of travel of the shift arms 82, 84 of each respective shifting assembly thereby preventing their displacement which furthermore prevents movement of the shift lever from a neutral position. In the most preferred form of the invention, the projections 160 on each locking member 132, 134 positively engages with the openings or slot 162 on the shift arms 82, 84 respectively, of each shifting assembly.

When the condition of the transmission is to be changed, the operator normally, depresses the clutch pedal 16 from its preset position thereby effectively disconnecting the driven assembly 12 from receiving power. The force transfer mechanism 162 transmits the purposeful movement of the clutch pedal 16 into release of the neutral lock assembly 120. That is, upon depression of the clutch pedal 16, the neutral lock assembly 120 is released to allow the shift mechanism 40 to condition the transmission for operation as desired by the operator. Notably, the locking members 132 and 134 of each locking mechanism are biased into engagement with the shift arms of each shifting assembly such that when the shift mechanism 40 is returned to a neutral position, the neutral lock assembly 120 automatically reengages and thereby prevents further displacement of the shift mechanism from a neutral position until the operator makes a purposeful effort at shifting or changing the condition of the transmission.

From the above, it will be appreciated that the neutral lock assembly 120 is a relative simple mechanism which easily and positively controls shifting movements of a driven transmission assembly. Notably, when the driven transmission assembly 12 includes both speed and range transmissions, the neutral lock assembly of the present invention can include separate locking mechanisms for controlling operation of the shifting movements of either transmission. Moreover, a common actuator can be utilized simultaneously to operate both locking mechanisms to facilitate shifting movements of one or both transmissions.

From the foregoing, it will be observed and numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the spirit and scope of the claims.

What is claimed is:

1. A shift mechanism arranged in combination with and for conditioning a transmission assembly of an off-highway implement between a neutral condition and any one of at least four drive conditions, said implement having a clutch assembly including a manually actuated clutch pedal for selectively controlling the transference of power to the transmission assembly, said shift mechanism comprising:
   a first shift arm connected to the transmission assembly and movable along a predetermined path of travel between a neutral position corresponding to the neutral condition of the transmission assembly and either of first or second drive positions corresponding to first or second drive conditions for the transmission assembly;
   a second shift arm connected to the transmission assembly and movable along a predetermined path of travel between a neutral position corresponding to the neutral condition of the transmission assembly and third and fourth drive positions corresponding to third and fourth drive conditions for the transmission assembly;
   a shift lever mounted for movement from a neutral position corresponding to the neutral condition of the transmission assembly into releasable engagement with either of said shift arms such that said transmission assembly can be conditioned into any one of said drive conditions by moving the appropriate shift arm into the corresponding drive position;
   a casing for mounting and housing said shift arms, and wherein a position of said shift lever extends beyond said casing to facilitate selective shift lever movement by the operator; and
   a mechanical interlock system including a bracket affixed to said casing and having first and second locking members arranged on opposite sides thereof for preventing movement of either of the shift arms and thereby the shift lever from their neutral position until the clutch pedal is depressed by the operator.

2. The shift mechanism according to claim 1 wherein said mechanical interlock system further includes a spring for resiliently biasing said first locking member into engagement with said first shift arm, with said first locking member being movable against the action of the spring and out of engagement with the first shift arm in response to depression of the clutch pedal.

3. The shift mechanism according to claim 1 wherein said mechanical interlock system further includes a spring for resiliently biasing said second locking member into engagement with the second shift arm, with said second locking member being movable against the action of the spring and out of engagement with the second shift arm in response to depression of the clutch pedal.

4. The shift mechanism according to claim 1 wherein each locking member is configured as a cantilevered arm which is pivotally connected to the bracket for vertical pivotal movement relative to the first and second shift arms.

5. The shift mechanism according to claim 4 wherein each locking member is configured with a guide surface thereon for facilitating reciprocatory guided movement of the locking members relative to the mounting bracket.

6. The shift mechanism according to claim 4 wherein a pin interconnects the free ends of the locking members relative to each other such that either of the shift arms can be moved and thereby the transmission assembly can be conditioned into any one of the drive conditions upon depression of the clutch pedal.

7. The shift mechanism according to claim 1 wherein a force transfer mechanism interconnects the clutch pedal with the first and second locking members of the mechanical interlock system.

8. A shift mechanism arranged in combination with an off-highway implement having a variable speed synchronized transmission which is shiftable from a neutral condition to any of a plurality of gear ratios, a variable range transmission connected to the speed transmission and which is shiftable from a neutral condition to any of a plurality of ranges, and a clutch assembly including a clutch pedal for selectively controlling the transference of power to the transmissions, said shift mechanism comprising:
   a speed transmission shift lever mounted for movement between a neutral position corresponding to the neutral condition of the speed transmission and a plurality of gear ratio positions;
   a speed transmission shifter assembly connected to the speed transmission and including at least two shift arms which are movable in response to shifting movements of the speed transmission shift lever thereby conditioning the speed transmission into either a neutral condition or any of the plurality of gear ratios selected by the operator through shifting movements of the speed transmission shift lever;
   a range transmission shift lever mounted for movement between a neutral position corresponding to a neutral condition for the range transmission and a plurality of range positions;
   a range transmission shifter assembly connected to the range transmission and including at least two shift arms which are movable in response to shifting movements of the range transmission shift lever thereby conditioning the range transmission into either a neutral condition or any of the plurality of range positions selected by the operator through shifting movements of the range transmission shift lever; and a mechanical interlock system for preventing shifting movements of either of the transmission shift levers from their neutral position until the clutch is depressed a predetermined amount to allow either transmission to be shifted from one condition to another condition, said mechanical interlock system comprising a speed transmission neutral lock mechanism for preventing movement of the shift arms of the speed transmission shifter assembly from a neutral position until the clutch pedal is depressed said predetermined amount and a range transmission neutral lock mechanism for preventing movement of the shift arms of the range transmission shifter assembly from a neutral position until the clutch pedal is depressed said predetermined amount.

9. The shift mechanism according to claim 8 wherein said speed transmission neutral lock mechanism and said range transmission neutral lock mechanism are connected to a common actuator which responds to depression of the clutch pedal.

10. The shift mechanism according to claim 9 wherein said actuator comprises a cable connected toward one end to the clutch pedal used to actuate the clutch assembly and conjointly connected at the other end to the speed transmission neutral lock mechanism and the range transmission neutral lock mechanism.

11. The shift mechanism according to claim 8 wherein each neutral lock mechanism includes a pair of arms disposed adjacent to each other beneath the shift arms of the respective shifter assembly and biased into engagement therewith so as to prevent movement of the respective shifting assembly until the clutch pedal is depressed said predetermined amount to allow either the transmission or the transfer assembly to be shifted from one condition to another condition.

12. The shift mechanism according to claim 11 further including a casing having said speed transmission shifter assembly and said range transmission shifter assembly housed therewithin for movement about a common axis, and wherein each neutral lock mechanism further includes a mounting housed within and connected to said casing, with said mounting extending between the arms of each respective neutral lock mechanism.

13. An off-highway implement having a transmission assembly which is shiftable from a neutral condition to any of a plurality of drive conditions, a clutch for selectively transferring power to the transmission and which operates under the influence of a manually actuated clutch pedal which is biased into a preset position, and a shift mechanism for conditioning said transmission assembly between a neutral condition and any one of said drive conditions, said shifting mechanism comprising:

a transmission shift lever mounted on a casing for movement between a neutral position corresponding to the neutral condition of the transmission assembly and any one of a plurality of drive conditions, and wherein at least a portion of said lever extends through a slot in the casing defining the shifting pattern for the transmission assembly;

a transmission shifter assembly mounted within said casing and connected to the transmission assembly, said shifter assembly including first and second pivotal shift arms mounted on a common axis on opposite sides of a free end of said transmission shift lever, each arm being independently movable relative to the other between a neutral position corresponding to the neutral condition of said transmission assembly and through a predetermined arc of travel to a drive position in response to shifting movements of the transmission shift lever thereby conditioning the transmission assembly into either a neutral condition or any of said plurality of drive conditions selected by the operator through movements of the shift lever; and a mechanical interlock system including first and second locking arms pivotally mounted for movement about a common axis and arranged in adjacent relationship relative to each other, each of said arms extending into the predetermined path of travel of and engagement with the shift arms to prevent movement of the shift arms and thereby the shift lever away from their neutral positions as long as said clutch pedal remains in its preset position and are movable out of engagement with the shift arms in response to purposeful displacement of the clutch pedal from its present position under the influence of the operator.

14. The off-highway implement according to claim 13 wherein each locking arm includes a lock which is releasably accommodated within an opening provided on a respective shift arm establish a positive locking relationship between the locking arm and the shift arm.

* * * * *